United States Patent
Asai et al.

(10) Patent No.: US 8,517,801 B2
(45) Date of Patent: Aug. 27, 2013

(54) METHOD FOR PRODUCING PULLEY FOR BELT-TYPE CONTINUOUSLY VARIABLE TRANSMISSION

(75) Inventors: Nobuhiro Asai, Utsunomiya (JP); Satoshi Kaneko, Utsunomiya (JP); Masaharu Kitafuji, Niiza (JP); Daisuke Koshino, Utsunomiya (JP); Tsuyoshi Kubota, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 284 days.

(21) Appl. No.: 12/973,026

(22) Filed: Dec. 20, 2010

(65) Prior Publication Data
US 2011/0159788 A1 Jun. 30, 2011

(30) Foreign Application Priority Data

Dec. 28, 2009 (JP) ................................. 2009-296748

(51) Int. Cl.
*B24B 1/00* (2006.01)
(52) U.S. Cl.
USPC .................................. 451/57; 451/59; 451/63
(58) Field of Classification Search
USPC ................................. 451/57, 59, 63
See application file for complete search history.

(56) References Cited

U.S. PATENT DOCUMENTS

| 4,947,533 | A  * | 8/1990 | Taniguchi et al. | 29/894 |
| 7,806,793 | B2 * | 10/2010 | Yoshida et al. | 474/188 |
| 2005/0221938 | A1 * | 10/2005 | Yoshida et al. | 474/242 |

FOREIGN PATENT DOCUMENTS

| JP | 02-30437 A | 1/1990 |
| JP | 2004-183783 A | 7/2004 |
| JP | 2005-321090 A | 11/2005 |
| JP | 2006-292093 A | 10/2006 |
| JP | 2007-262470 A | 10/2007 |

* cited by examiner

*Primary Examiner* — Maurina Rachuba
(74) *Attorney, Agent, or Firm* — Arent Fox LLP

(57) ABSTRACT

A method includes a grinding step of forming the shape of a contact surface, a grooving step of roughening the shaped contact surface to form grooves therein, and a contact surface lapping step of lapping the contact surface having the grooves with a lapping film to form oil grooves for holding a lubricant oil. The surface roughness of the contact surface is such that the maximum height roughness Rz is 4 μm or less, the mean length RSm of the roughness profile elements is 30 to 60 μm, the skewness Rsk of the roughness profile is −2.7 to −0.6 (no unit), the reduced peak height Rpk is 0.09 μm or less, and the reduced valley depth Rvk is 0.4 to 1.3 μm.

2 Claims, 7 Drawing Sheets

METHOD FOR PRODUCING PULLEY FOR BELT-TYPE CONTINUOUSLY VARIABLE TRANSMISSION

CROSS-REFERENCE TO RELATED APPLICATION

This application is based upon and claims the benefit of priority from Japanese Patent Application No. 2009-296748 filed on Dec. 28, 2009, of which the contents are incorporated herein by reference.

BACKGROUND OF THE INVENTION

1. Field of the Invention

The present invention relates to a method for producing a pulley for a belt-type continuously variable transmission of an automobile or the like (a belt-type continuously variable transmission pulley).

2. Description of the Related Art

In the field of pulleys for belt-type continuously variable transmissions (hereinafter referred to as belt-type CVTs), for example, Japanese Laid-Open Patent Publication No. 2007-262470 is known as a conventional technology specifying a surface texture of a sliding surface on which a belt is slid.

In Japanese Laid-Open Patent Publication No. 2007-262470, a pulley is composed of a chrome steel or a chrome molybdenum steel according to JIS G4053. The sliding surface of the pulley contains a hardened layer harder than the inside, and has a surface texture with a surface roughness Rz of 1.4 to 6.3 μm and a ratio Rpk/Rvk (a ratio of the reduced peak height Rpk to the reduced valley depth Rvk according to JIS B0671) of less than 0.75.

The pulley having the above surface texture is excellent in abrasion resistance and is useful for the CVT.

In view of improving the abrasion resistance of the sliding surface, it is important to increase an oil holding property (an ability to hold a lubricant oil) of the sliding surface. This is described also in Japanese Laid-Open Patent Publication No. 2007-262470. In this patent publication, the surface texture of the sliding surface is defined based on the surface roughness Rz, the reduced peak height Rpk, and the reduced valley depth Rvk, and it is particularly preferred that the reduced valley depth Rvk is larger than the reduced peak height Rpk.

However, even when the reduced valley depth is larger than the reduced peak height, a lubricant oil cannot be easily introduced into a valley with a sharp shape. On the contrary, when the valley width is excessively larger than the peak width, the lubricant oil in the valley may readily leak therefrom. Thus, it may be difficult to hold the lubricant oil in the valley, so that the pulley cannot always have a desired oil holding property.

SUMMARY OF THE INVENTION

In view of the above problems, an object of the present invention is to provide a method for producing a pulley for a belt-type continuously variable transmission, capable of producing a belt-type CVT pulley having improved oil holding property and improved abrasion resistance by a simplified process at lower cost with excellent reproducibility.

[1] According to a first aspect of the present invention, a method for producing a pulley for a belt-type continuously variable transmission, a contact surface of the pulley to be brought into contact with an element being formed by machining, is characterized in that the method comprises a grinding step of forming the shape of the contact surface, a grooving step of roughening the contact surface to form grooves therein, and a contact surface lapping step of lapping the contact surface having the grooves with a lapping film to form oil grooves for holding a lubricant oil, and the contact surface has such a surface roughness that the maximum height roughness Rz is 4 μm or less, the mean length RSm of the roughness profile elements is 30 to 60 μm, the skewness Rsk of the roughness profile is −2.7 to −0.6 (no unit), the reduced peak height Rpk is 0.09 μm or less, and the reduced valley depth Rvk is 0.4 to 1.3 μm.

With the above method, oil holding property of the belt-type CVT pulley can be improved, and thus the belt-type CVT pulley having improved abrasion resistance can be produced with excellent reproducibility.

[2] According to a second aspect of the present invention, a method for producing a pulley for a belt-type continuously variable transmission, a contact surface of the pulley to be brought into contact with an element being formed by machining, is characterized in that the method comprises a grooving step of simultaneously performing a grinding process for forming the shape of the contact surface and a process for roughening the contact surface, to form grooves therein, and a contact surface lapping step of lapping the contact surface having the grooves with a lapping film to form oil grooves for holding a lubricant oil, and the contact surface has such a surface roughness that the maximum height roughness Rz is 4 μm or less, the mean length RSm of the roughness profile elements is 30 to 60 μm, the skewness Rsk of the roughness profile is −2.7 to −0.6 (no unit), the reduced peak height Rpk is 0.09 μm or less, and the reduced valley depth Rvk is 0.4 to 1.3 μm.

With the above method, oil holding property of a belt-type CVT pulley can be improved, and thus the belt-type CVT pulley having improved abrasion resistance can be produced with excellent reproducibility. Furthermore, the pulley can be obtained by a simplified process at lower cost.

As described above, in the belt-type continuously variable transmission pulley production method of the present invention, the belt-type CVT pulley having improved oil holding property and improved abrasion resistance can be produced by a simplified process at lower cost with excellent reproducibility.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An embodiment of the belt-type CVT pulley production method of the present invention will be described below with reference to FIGS. 1 to 7. It should be noted that, in this description, a numeric range of "A to B" includes both the numeric values A and B as the lower limit and upper limit values, respectively.

Figure 1:
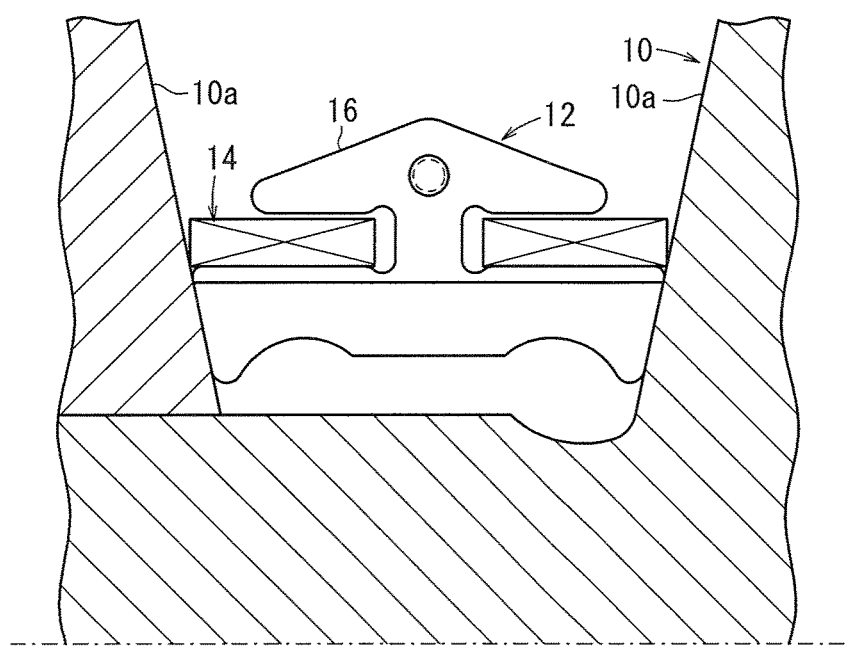
FIG. 1 is a fragmentary cross-sectional view showing a metal belt and a belt-type CVT pulley produced by a production method according to an embodiment of the present invention.
Figure 2:
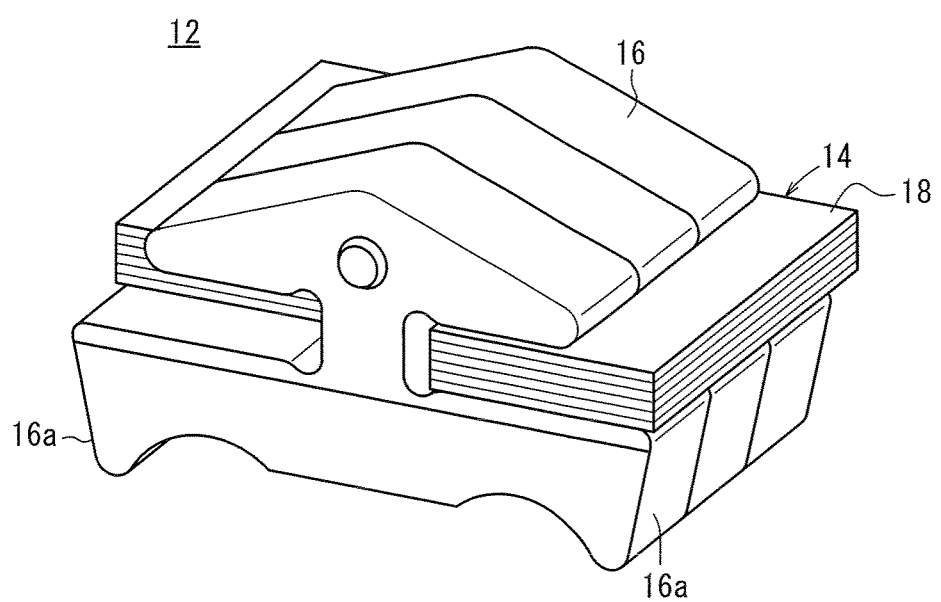
FIG. 2 is a fragmentary perspective view partially showing the metal belt.

As shown in FIG. 1, a belt-type CVT pulley (hereinafter referred to simply as the pulley 10) produced by a belt-type CVT pulley production method according to this embodiment (hereinafter referred to as the production method) is used with a metal belt 12 wound thereon. As shown in FIG. 2, in the metal belt 12, a large number of metal elements 16 are supported by a pair of right and left metal ring aggregates 14, and each of the metal ring aggregates 14 is provided by stacking a plurality of metal rings 18. Each of the metal elements 16 has at the horizontal ends a pair of contact surfaces 16a that can be brought into contact with inner wall surfaces (contact surfaces 10a) of the pulley 10 (see FIG. 1).

Figure 3:
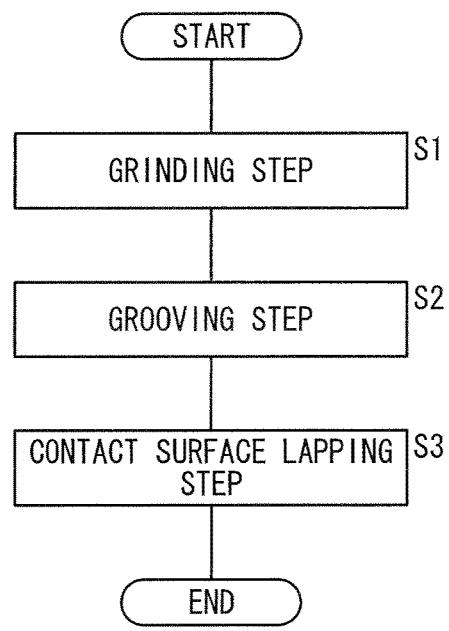
FIG. 3 is a process chart of a first method for producing the belt-type CVT pulley.

As shown in FIG. 3, a first method of the production method according to this embodiment contains a grinding step S1 of forming the shape of the contact surface 10a in the pulley 10, a grooving step S2 of roughening the contact surface 10a to form grooves therein, and a contact surface lapping step S3 of lapping the contact surface 10a having the grooves with a lapping film to form oil grooves for holding a lubricant oil.

After the step S3, the surface roughness of the contact surface 10a is such that the maximum height roughness Rz is 4 μm or less, the mean length RSm of the roughness profile elements is 30 to 60 μm, the skewness Rsk of the roughness profile is −2.7 to −0.6 (no unit), the reduced peak height Rpk is 0.09 μm or less, and the reduced valley depth Rvk is 0.4 to 1.3 μm.

The above parameters of the surface roughness will be described below with reference to FIGS. 4 to 6.

A stylus is moved on the contact surface 10a, and the trajectory of the stylus tip center is measured to obtain a traced profile. The traced profile is A/D-converted to a total profile (quantized data of the traced profile). The total profile is low-pass filtered using a cutoff value λs to obtain a primary profile without stylus distortions or noises. Furthermore, the primary profile is high-pass filtered using a cutoff value λc to obtain a roughness profile.

The maximum height roughness Rz is the maximum height in the roughness profile, which is the sum of the largest peak height (the absolute value) and the largest valley depth (the absolute value) within the reference length Lr according to JIS B0633 2001 (ISO 4288:1996).

Figure 4:
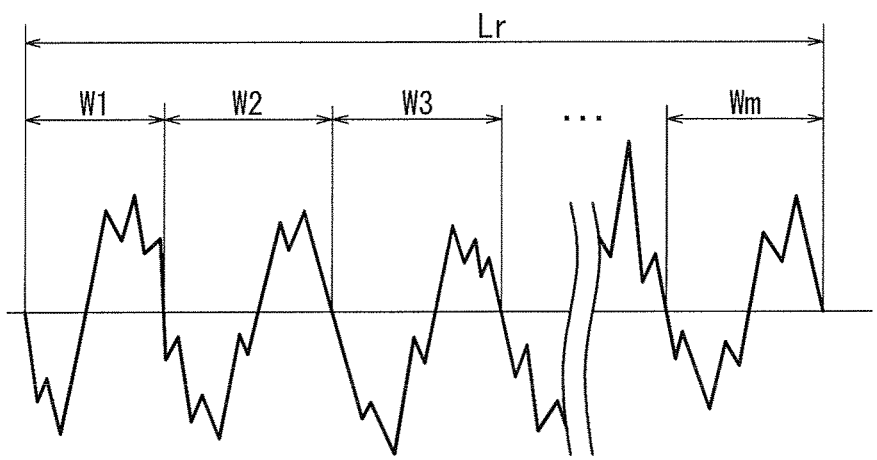
FIG. 4 is a chart for explaining a mean length RSm of roughness profile elements.

As shown in FIG. 4, the mean length RSm of the roughness profile elements is the average of the lengths of the roughness profile elements (the peak-valley combinations) contained within the reference length Lr, and is obtained using the following arithmetic expression (1).

$$RSm = \frac{1}{m}\sum_{i=1}^{m} Wi \qquad (1)$$

roughness profile elements have an excessively large pitch, and the lubricant oil readily leaks from the contact surface 10a, resulting in oil holding property deterioration. On the other hand, when the mean length RSm is less than 30 μm, the depth of the valley is disadvantageously insufficient for holding the lubricant oil.

The skewness Rsk of the roughness profile is the mean cube value of Z(x) non-dimensionalized by the cube of the root-mean-square height Rq within the reference length, and is obtained using the following arithmetic expression (2).

$$Rsk = \frac{1}{Rq^3}\left[\frac{1}{Lr}\int_0^{Lr} Z^3(x)\,dx\right] \qquad (2)$$

Figure 5A:
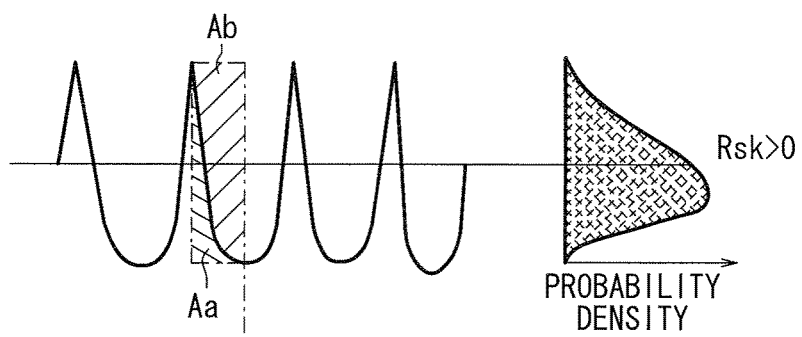
FIGS. 5A and 5B are charts for explaining a skewness Rsk of a roughness profile.
Figure 5B:
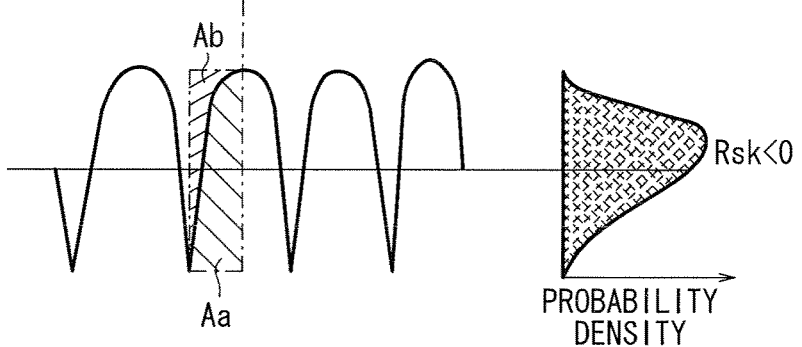

As shown in FIGS. 5A and 5B, a unit length has a peak area Aa and a valley area Ab. In FIG. 5A, the peak area Aa is smaller than the valley area Ab, the probability density distribution peak is shifted to the right from the center, and the skewness Rsk is a positive value (>0). On the other hand, in FIG. 5B, the peak area Aa is larger than the valley area Ab, the probability density distribution peak is shifted to the left from the center, and the skewness Rsk is a negative value (<0). When the probability density distribution is a normal distribution, the skewness Rsk is 0. Thus, the skewness Rsk represents the symmetry of the peak and the valley, and is a parameter useful for confirming the lubricant oil holding ability. In general, when the contact surface 10a is ground, it exhibits a negative skewness Rsk. The lubricant oil holding ability can be improved by reducing the negative tendency. When the contact surface 10a has a positive skewness Rsk, the peak has a sharp top shape and the valley has a large width, whereby the lubricant oil readily leaks from the valley, resulting in oil holding property deterioration. Though the pulley 10 may have a skewness Rsk of less than −2.7 (an absolute value of the skewness is larger than 2.7), preferably the lower limit of the skewness Rsk is −2.7 from the viewpoint of the oil holding property.

Figure 6:
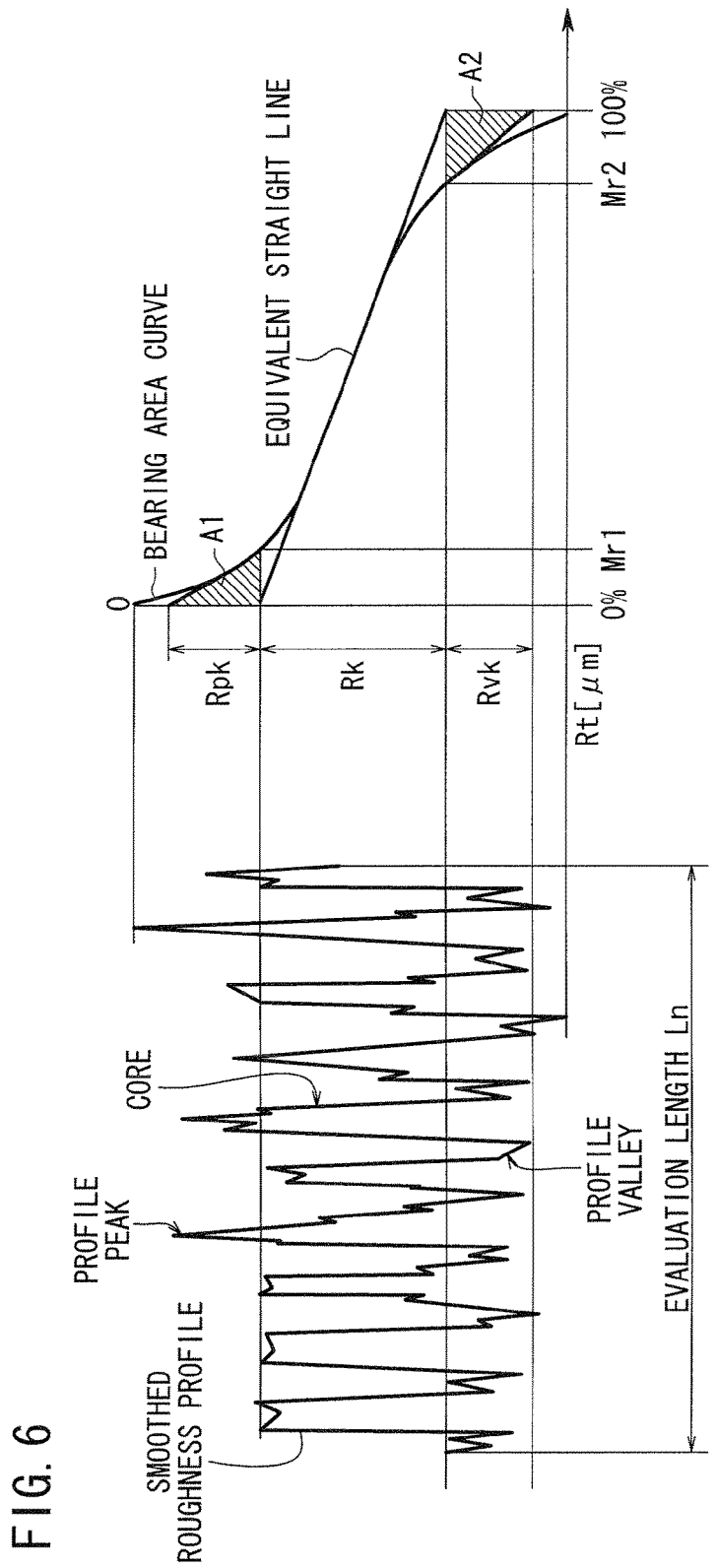
FIG. 6 is a chart for explaining a reduced peak height Rpk and a reduced valley depth Rvk.

In this embodiment, a smoothed roughness profile of the contact surface 10a is obtained from the primary profile (see FIG. 6). The smoothed roughness profile is used to obtain parameters (the reduced peak height Rpk and the reduced valley depth Rvk) for lubricity evaluation of a plateau structure surface.

The smoothed roughness profile may be obtained by the following filtering treatments. Thus, the above primary profile is treated with a phase compensation filter to calculate a first mean line, a DC portion is removed from the first mean line to calculate a second mean line, the second mean line is treated with a phase compensation filter to calculate a third mean line, and the third mean line is subtracted from the primary profile to obtain the smoothed roughness profile.

As shown in FIG. 6, in the obtained smoothed roughness profile, the peak widths are added while a section line is moved from the upper end toward the lower end within the evaluation length Ln to make a bearing area curve. A 40%-length equivalent straight line is drawn with respect to the bearing area curve. The intersection point between the equivalent straight line and the 0% vertical line is defined as the upper level of the core, and the intersection point between the equivalent straight line and the 100% vertical line is defined as the lower level of the core. The evaluation length Ln is generally five times as large as the reference length Lr.

The area of a triangle equivalent to the area surrounded by the top of the bearing area curve and the upper level of the core is determined as an equivalent triangle area A1, and the height of the equivalent triangle is defined as the reduced peak height Rpk. On the other hand, the area of a triangle equivalent to the area surrounded by the 100% vertical line, the lower level of the core, and the bearing area curve is determined as an equivalent triangle area A2, and the height of the equivalent triangle is defined as the reduced valley depth Rvk.

In the first method, for example, after a grinding process is performed using a cutting tool in step S1, a rough lapping process may be performed using a lapping agent (a material containing a machining fluid and abrasive grains mixed in the machining fluid) with careful attention to the affect on the reduced valley depth Rvk in step S2, and then a finish lapping process may be performed using a lapping film in step S3.

In the first method, since the maximum height roughness Rz is 4 μm or less, the reduced peak height Rpk is 0.09 μm or less, the reduced valley depth Rvk is 0.4 to 1.3 μm, and further the mean length RSm of the roughness profile elements is 30 to 60 μm, and the skewness Rsk of the roughness profile is −2.7 to −0.6 (no unit), oil holding property of the belt-type CVT pulley 10 can be improved and thus the belt-type CVT pulley 10 with improved abrasion resistance can be produced with excellent reproducibility.

Figure 7:
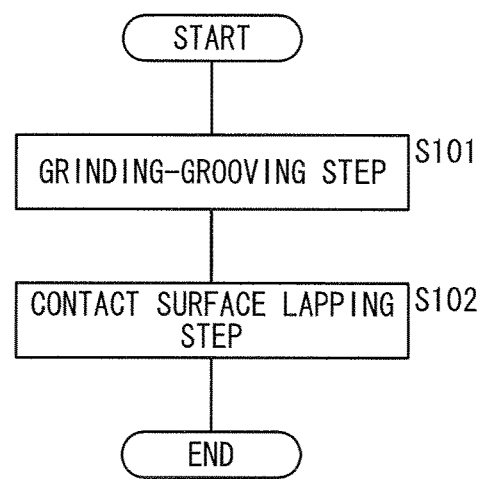
FIG. 7 is a process chart of a second method for producing the belt-type CVT pulley.

As shown in FIG. 7, a second method of the production method according to this embodiment contains a grinding-grooving step S101 of performing a grinding process for forming the shape of the contact surface 10a in the pulley 10 while roughening the contact surface 10a to form grooves therein, and a contact surface lapping step S102 of lapping the contact surface 10a having the grooves with a lapping film to form oil grooves for holding a lubricant oil.

Also in the second method, after step S102, the surface roughness of the contact surface 10a is such that the maximum height roughness Rz is 4 μm or less, the mean length RSm of the roughness profile elements is 30 to 60 μm, the skewness Rsk of the roughness profile is −2.7 to −0.6 (no unit), the reduced peak height Rpk is 0.09 μm or less, and the reduced valley depth Rvk is 0.4 to 1.3 μm.

In the second method, for example, a grooving process and a grinding process may be simultaneously performed (a grinding-grooving process may be performed) using a surface grinder while adjusting the surface texture in step S101, and then a finish lapping process may be performed using a lapping film in step S102.

In the second method, since the maximum height roughness Rz is 4 μm or less, the reduced peak height Rpk is 0.09 μm or less, the reduced valley depth Rvk is 0.4 to 1.3 μm, and further the mean length RSm of the roughness profile elements is 30 to 60 μm, and the skewness Rsk of the roughness profile is −2.7 to −0.6 (no unit) in the same manner as the above first method, oil holding property of the belt-type CVT pulley 10 can be improved and thus the belt-type CVT pulley 10 with improved abrasion resistance can be produced with excellent reproducibility.

Particularly, in the second method, since the grinding process for forming the shape of the contact surface 10a of the pulley 10 is performed while the contact surface 10a is roughened to form the grooves therein in the grinding-grooving step S101, the pulley 10 can be obtained by simplified processes at lower cost.

EXAMPLES

In Examples 1 to 6 and Comparative Examples 1 to 10, a contact surface 10a of each pulley 10 was processed, and an abrasion loss of each contact surface 10a was measured and evaluated.

[Material and Carbon Concentration]

The materials and the surface carbon concentrations of Examples 1 to 6 and Comparative Examples 1 to 10 are shown in Table 1.

[Surface Processing Method]

The surface processing of each contact surface 10a was performed as follows (see Table 1).

Thus, in the surface processing of Comparative Examples 1 to 3, 9 and 10, a grinding process was performed using a cutting tool.

In the surface processing of Examples 1 to 3 and Comparative Examples 4 to 8, after a grinding process was performed using a cutting tool, a rough lapping process was performed using a lapping agent (a material containing a machining fluid and abrasive grains mixed in the machining fluid) with careful attention to the affect on the reduced valley depth, and then a finish lapping process was performed using a lapping film.

In the surface processing of Examples 4 to 6, a grooving process and a grinding process were simultaneously performed (a grinding-grooving process was performed) using a surface grinder while adjusting the surface texture, and then a finish lapping process was performed using a lapping film.

TABLE 1

| | Carbon concentration (% by mass) | Material | Surface processing of contact surface |
|---|---|---|---|
| Comp. Ex. 1 | 0.64 | SCM420 | Grinding |
| Comp. Ex. 2 | 0.61 | SCM420 | Grinding |
| Comp. Ex. 3 | 0.60 | SCM420 | Grinding |
| Ex. 1 | 0.69 | SCM420 | Grinding→Rough lapping →Finish lapping |
| Ex. 2 | 0.75 | SCM420 | Grinding→Rough lapping →Finish lapping |
| Ex. 3 | 0.61 | SCM420 | Grinding→Rough lapping →Finish lapping |
| Ex. 4 | 0.61 | SCM420 | Grinding-grooving →Finish lapping |
| Ex. 5 | 0.61 | SCM420 | Grinding-grooving →Finish lapping |
| Ex. 6 | 0.60 | SCM420 | Grinding-grooving →Finish lapping |
| Comp. Ex. 4 | 0.62 | SCM420 | Grinding→Rough lapping →Finish lapping |
| Comp. Ex. 5 | 0.64 | SCM420 | Grinding→Rough lapping →Finish lapping |
| Comp. Ex. 6 | 0.69 | SCM420 | Grinding→Rough lapping →Finish lapping |
| Comp. Ex. 7 | 0.61 | SCM420 | Grinding→Rough lapping →Finish lapping |
| Comp. Ex. 8 | 0.60 | SCM420 | Grinding→Rough lapping →Finish lapping |
| Comp. Ex. 9 | 0.75 | SCM420 | Grinding |
| Comp. Ex. 10 | 0.61 | SCM420 | Grinding |

[Surface Roughness]

In each of Examples 1 to 6 and Comparative Examples 1 to 10, the surface hardness (HRc), the maximum height roughness Rz (μm), the mean length RSm (μm) of the roughness profile elements, the skewness Rsk (no unit) of the roughness profile, the reduced peak height Rpk (μm), and the reduced valley depth Rvk (μm) are shown in Table 2.

TABLE 2

| | Surface hardness (HRc) | Rz (μm) | RSm (μm) | Rsk (no unit) | Rpk (μm) | Rvk (μm) | Abrasion loss (μm) |
|---|---|---|---|---|---|---|---|
| Comp. Ex. 1 | 58 | 2.53 | 61.0 | −1.1 | 1.26 | 1.26 | 21.8 |
| Comp. Ex. 2 | 64 | 3.39 | 51.6 | −1.6 | 1.70 | 1.69 | 14.9 |
| Comp. Ex. 3 | 61 | 2.95 | 44.9 | −1.2 | 1.48 | 1.50 | 18.3 |
| Ex. 1 | 58 | 4.00 | 32.1 | −1.5 | 0.04 | 1.20 | 3.3 |
| Ex. 2 | 64 | 2.95 | 60.0 | −1.3 | 0.09 | 1.11 | 8.1 |
| Ex. 3 | 61 | 2.11 | 52.7 | −0.9 | 0.05 | 1.01 | 4.9 |
| Ex. 4 | 58 | 3.21 | 38.5 | −1.4 | 0.03 | 0.95 | 3.1 |
| Ex. 5 | 64 | 2.53 | 51.6 | −0.9 | 0.09 | 0.82 | 10.0 |
| Ex. 6 | 61 | 3.39 | 48.9 | −1.4 | 0.02 | 0.71 | 2.8 |
| Comp. Ex. 4 | 57 | 2.35 | 35.8 | −1.1 | 0.56 | 1.01 | 12.8 |
| Comp. Ex. 5 | 48 | 3.46 | 52.7 | −1.6 | 0.78 | 1.72 | 17.2 |
| Comp. Ex. 6 | 48 | 2.53 | 38.5 | −1.2 | 0.58 | 1.32 | 13.1 |
| Comp. Ex. 7 | 46 | 3.39 | 51.6 | −1.5 | 0.43 | 1.38 | 14.9 |
| Comp. Ex. 8 | 40 | 2.95 | 44.9 | −1.3 | 0.43 | 0.95 | 18.3 |
| Comp. Ex. 9 | 62 | 2.11 | 32.1 | −0.9 | 1.12 | 0.82 | 21.8 |
| Comp. Ex. 10 | 49 | 3.21 | 48.9 | −1.4 | 0.81 | 0.71 | 19.3 |

[Evaluation]

Each sample of Examples 1 to 6 and Comparative Examples 1 to 10 was subjected to an abrasion test in the same manner as Japanese Laid-Open Patent Publication No. 2007-262470 to evaluate the abrasion resistance.

In the abrasion test, each sample was incorporated in a belt-type CVT having the above structure, and the CVT was attached to an apparatus capable of setting any value of the input torque.

In the belt-type CVT, a belt was wound on the position corresponding to the under-drive condition in which the maximum transmission gear ratio (γmax) is obtained. Thus, the abrasion test was carried out under the strictest condition in the practical use with respect to a torque input to the primary pulley (the pulley 10) and a belt pressure between the contact surface 10a and the metal belt 12.

More specifically, a belt-type CVT, which had a specification of 200-Nm input torque Tin to the primary pulley (the pulley 10), was driven for 17 hours under an input torque Tin of 300 Nm to the primary pulley (the pulley 10), an input rotation number Nin of 3000 rpm to the primary pulley (the pulley 10), a fixed γmax, and an oil temperature of 150° C. After the driving, the abrasion loss of the contact surface 10a in the pulley 10 was measured.

Each sample was judged to be acceptable if the abrasion loss was 10 μm or less, and to be rejected if the abrasion loss was more than 10 μm. The results are shown in Table 2.

As shown in Table 2, the samples of Comparative Examples 1 to 10 had abrasion losses of more than 10 μm and were judged to be rejected. In contrast, the samples of Examples 1 to 6 had abrasion losses of 10 μm or less and were acceptable. It is clear from this that each preferred pulley having an abrasion loss of 10 μm or less was obtained when the maximum height roughness Rz was 4 μm or less, the mean length RSm of the roughness profile elements was 30 to 60 μm, the skewness Rsk of the roughness profile was −2.7 to −0.6 (no unit), the reduced peak height Rpk was 0.09 μm or less, and the reduced valley depth Rvk was 0.4 to 1.3 μm. Of Examples 1 to 6, Examples 4 to 6 were formed only by the grinding-grooving step (the grinding-grooving process) and the contact surface lapping step (the finish lapping process), whereas Examples 1 to 3 were formed by the grinding step, the grooving step, and the contact surface lapping step. Thus, the number of the steps of Examples 4 to 6 is smaller than that of Examples 1 to 3. Thus, in Examples 4 to 6, the production process can be simplified, and the production cost can be reduced.

It is to be understood that the belt-type continuously variable transmission pulley production method of the present invention is not limited to the above embodiments, and various changes and modifications may be made therein without departing from the scope of the appended claims.

What is claimed is:

1. A method for producing a pulley for a belt-type continuously variable transmission, a contact surface of the pulley to be brought into contact with an element being formed by machining, the method comprising:
    a grinding step of forming a shape of the contact surface;
    a grooving step of roughening the contact surface to form grooves therein; and
    a contact surface lapping step of lapping the contact surface having the grooves with a lapping film to form oil grooves for holding a lubricant oil,
    whereby the contact surface is provided with a surface roughness having a maximum height roughness Rz of 4 μm or less, a mean length RSm of the roughness profile elements of 30 to 60 μm, a skewness Rsk of the roughness profile of −2.7 to −0.6 (no unit), a reduced peak height Rpk of 0.09 μm or less, and a reduced valley depth Rvk of 0.4 to 1.3 μm.

2. A method for producing a pulley for a belt-type continuously variable transmission, a contact surface of the pulley to be brought into contact with an element being formed by machining, the method comprising:
    a grooving step of simultaneously performing a grinding process for forming a shape of the contact surface and a process for roughening the contact surface, to form grooves therein; and
    a contact surface lapping step of lapping the contact surface having the grooves with a lapping film to form oil grooves for holding a lubricant oil,
    whereby the contact surface is provided with a surface roughness having a maximum height roughness Rz of 4 μm or less, a mean length RSm of the roughness profile elements of 30 to 60 μm, a skewness Rsk of the roughness profile of −2.7 to −0.6 (no unit), a reduced peak height Rpk of 0.09 μm or less, and a reduced valley depth Rvk of 0.4 to 1.3 μm.

* * * * *